(12) United States Patent
Rogers et al.

(10) Patent No.: US 10,805,366 B2
(45) Date of Patent: Oct. 13, 2020

(54) TECHNOLOGIES FOR END OF FRAME DETECTION IN STREAMING CONTENT

(71) Applicant: Intel Corporation, Santa Clara, CA (US)

(72) Inventors: Brian E. Rogers, Aloha, OR (US); Karthik Veeramani, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/543,085

(22) Filed: Aug. 16, 2019

(65) Prior Publication Data

US 2020/0084249 A1    Mar. 12, 2020

Related U.S. Application Data

(62) Division of application No. 14/998,230, filed on Dec. 26, 2015, now Pat. No. 10,389,773.

(60) Provisional application No. 62/244,020, filed on Oct. 20, 2015.

(51) Int. Cl.
*H04L 29/06* (2006.01)
*H04N 21/00* (2011.01)

(52) U.S. Cl.
CPC ...... *H04L 65/4069* (2013.01); *H04L 65/4084* (2013.01); *H04L 65/607* (2013.01); *H04L 65/608* (2013.01); *H04L 69/22* (2013.01); *H04N 21/00* (2013.01); *H04L 69/24* (2013.01)

(58) Field of Classification Search
CPC .... H04N 7/163; H04N 21/4334; H04N 21/84; H04N 21/4667; H04N 21/4508; H04N 7/16; H04N 7/173
See application file for complete search history.

(56) References Cited

U.S. PATENT DOCUMENTS

| 8,175,582 | B2 * | 5/2012 | Benco | H04L 67/2823 |
| | | | | 348/157 |
| 2002/0163932 | A1 * | 11/2002 | Fischer | H04L 1/0003 |
| | | | | 370/465 |
| 2003/0120664 | A1 * | 6/2003 | Davidson | H04L 69/12 |
| 2008/0106600 | A1 * | 5/2008 | Benco | H04L 67/2823 |
| | | | | 348/157 |

(Continued)

*Primary Examiner* — Arvin Eskandarnia
(74) *Attorney, Agent, or Firm* — Barnes & Thornburg LLP

(57) ABSTRACT

Technologies for end of frame marking and detection in streaming digital media content include a source computing device communicatively coupled to a destination computing device. The source computing device is configured to encode a frame of digital media content and insert an end of frame marker into a transport stream header of a network packet that includes an encoded payload corresponding to a chunk of data of the frame of digital media content. The destination computing device is configured to de-packetize received network packets and parse the transport stream headers of the received network packets to determine whether the network packet corresponds to an end of frame of the frame of digital media content. The destination computing device is further configured to transmit the encoded payloads of the received network packets to a decoder in response to a determination that the end of frame network packet has been received. Other embodiments are described and claimed.

20 Claims, 7 Drawing Sheets

(56) References Cited

U.S. PATENT DOCUMENTS

2008/0140632 A1* 6/2008 Pandya ................. G11C 15/00
2010/0002139 A1* 1/2010 Park ...................... H04H 20/28
                                                         348/565

* cited by examiner

TECHNOLOGIES FOR END OF FRAME DETECTION IN STREAMING CONTENT

CROSS-REFERENCE TO RELATED APPLICATION

The present application is a divisional application of U.S. application Ser. No. 14/998,230, entitled "TECHNOLOGIES FOR END OF FRAME DETECTION IN STREAMING CONTENT," which was filed on Dec. 26, 2015, issued on Aug. 20, 2019, as U.S. Pat. No. 10,389,773 and which claims priority under 35 U.S.C. § 119(e) to U.S. Provisional Patent Application Ser. No. 62/244,020, entitled "TECHNOLOGIES FOR END OF FRAME DETECTION IN STREAMING CONTENT," which was filed on Oct. 20, 2015.

BACKGROUND

Traditionally, playback of digital media content (e.g., movies, music, pictures, games, etc.) has been constrained to the computing device (e.g., desktop computer, smartphone, tablet, wearable, gaming system, television, etc.) on which the digital media content was stored. However, with the advent of cloud computing related technologies and increased capabilities of computing devices, services such as digital media content streaming, casting, and mirroring have sped up the generation, sharing, and consumption of digital media content as consumer devices capable of interacting with such content have become ubiquitous.

To deal with such vast amounts of data transfer in the on-demand landscape, various compression technologies have been implemented to support the streaming of digital media content in real-time with reduced latency. Such compression technologies (i.e., codecs and containers) include Moving Picture Experts Group standards (e.g., MPEG-2, MPEG-4, H.264, etc.) and MPEG transport stream (MPEG-TS). Further, various network control protocols, such as real time streaming protocol (RTSP), for example, have been developed for establishing and controlling media sessions between endpoint computing devices. Finally, various transport protocols (e.g., real-time transport protocol (RTP)) usable by the endpoint computing devices have been established for providing end-to-end network transport functions suitable for transmission of the digital media content in real-time.

However, some frames are too large to transmit in a single packet, thereby requiring a series of network packets making up a particular frame having to be received by an endpoint computing device before processing. Such processing (e.g., encoding, decoding, packetizing, de-packetizing, multiplexing, etc.) can introduce latency associated with streaming digital media content in real-time. For example, in present technologies, an endpoint computing device receiving a network packet that includes a portion of a frame of video being streamed to the endpoint computing device may contain an indicator (e.g., one or more bits of a header of the network packet) as to whether the network packet corresponds to the start of a new video frame. Accordingly, the endpoint computing device may only send the previously accumulated portions of the frame to a decoder upon receiving a network packet that corresponds to the first portion of the next frame, thereby introducing further latency into the decoding process.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
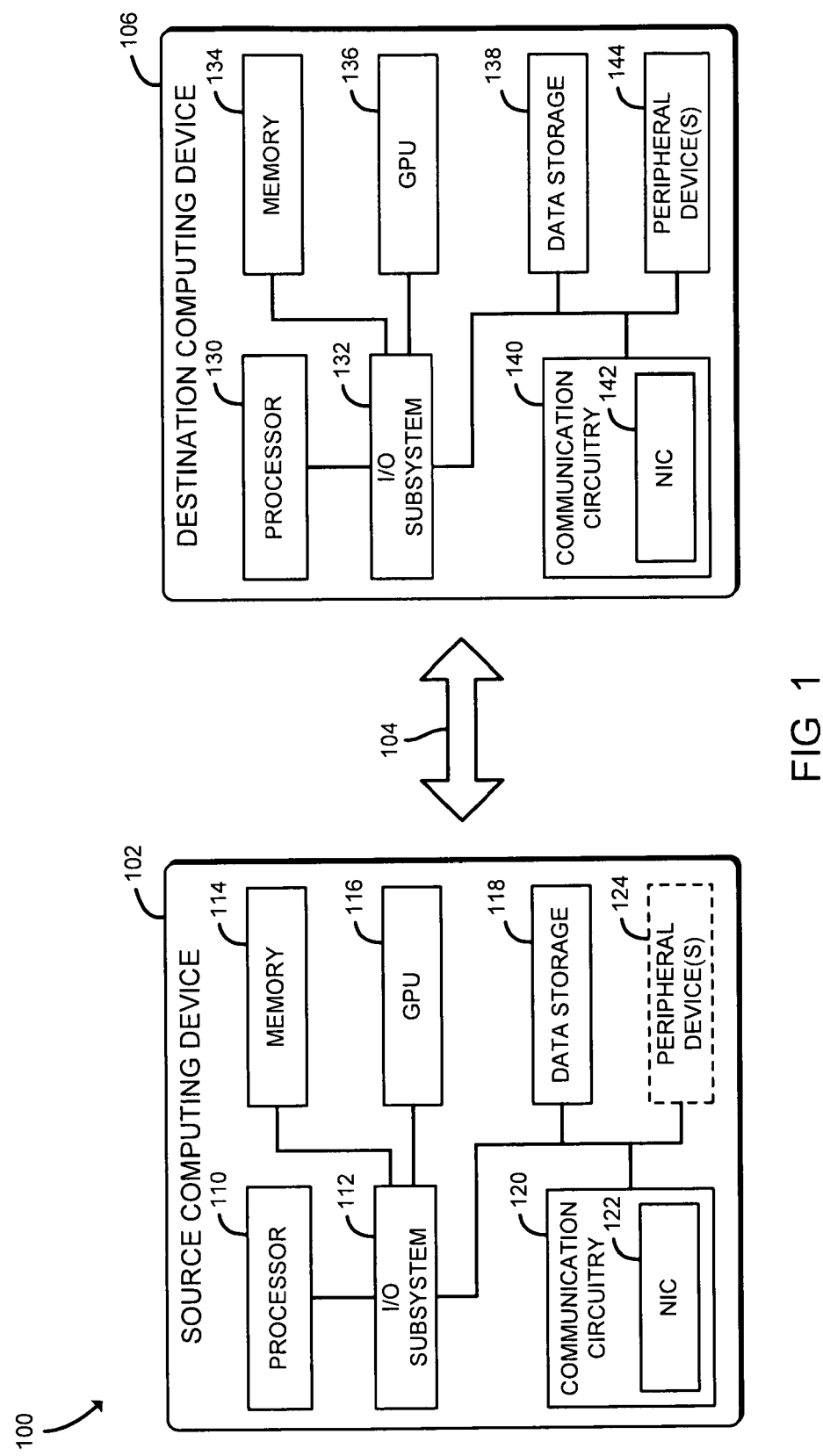
FIG. 1 is a simplified block diagram of at least one embodiment of a system for end of frame detection in streaming content.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for end of frame detection in streaming content (e.g., streaming digital media content) includes a source computing device 102 communicatively coupled to a destination computing device 106 via a communication channel 104. In use, the source computing device 102 streams digital media content (e.g., video content, audio content, streaming text content, etc.) to the destination computing device 106 via the communication channel 104, which may be established over a wireless connection.

As will be described in further detail, prior to transmission of the digital media content and subsequent to establishing the communication channel 104, the source computing device 102 is configured to encode (i.e., via an encoder of the source computing device 102, such as H.264) and packetize (i.e., via a packetizer of the source computing device 102) a frame of digital media content into a plurality of network packets. Additionally, the source computing device 102 is configured to encapsulate the packetized stream of network packets using a container format, such as MPEG-TS. Each of the network packets includes a header that includes identifying information of the network packet and a payload that includes data corresponding to at least a portion of the frame of the digital media content. The source computing device 102 is further configured to mark each network packet with an end of frame indicator at a designated field or set of bits within the container format header prior to transmitting each network packet to the destination computing device 106. In some embodiments, the marking may be performed by the packetizer of the source computing device 102.

As will also be described in further detail below, the destination computing device 106 is configured to receive the network packets from the source computing device 102 and determine whether each received network packet corresponds to an end of frame, such as by parsing the designated field or set of bits within a header of the received network packet. Upon receiving a network packet, the destination computing device 106 is further configured to accumulate the corresponding payload with other payloads of previously received network packets that were also determined not to correspond to an end of frame. To do so, a depacketizer of the destination computing device 106 may be configured to parse end of frame markers from a header of the container and send the accumulated payloads to a decoder of the destination computing device 106, upon determining a received network packet indicates that it is the last network packet of the frame (i.e., an end of frame network packet).

As such, unlike present technologies that detect a payload start indicator, latency attributable to an amount of time between detecting the last payload (i.e., an end of frame) and a first payload is reduced or otherwise eliminated. Further, unlike present technologies that require parsing of a field/bit of the H.264 header of the encoded payload to identify an end of frame indicator, the destination computing device 106 is configured to parse the transport stream header (e.g., the MPEG2-TS header) to identify the end of frame indicator.

It should be appreciated that the streaming of media content may include streaming, casting, and/or mirroring digital media content from the source computing device 102 to the destination computing device 106. It should be further appreciated that, while the context of the present disclosure is described below as marking frames of video content, such functionality described herein may be usable for other forms of digital media content that may be encoded and chunked, or otherwise packetized, prior to transmission, such that a network packet that includes a last payload of chunked data is capable of being determined as described herein.

The source computing device 102 may be embodied as any type of computing device that is capable of performing the functions described herein, such as, without limitation, a portable computing device (e.g., smartphone, tablet, laptop, notebook, wearable, etc.) that includes mobile hardware (e.g., processor, memory, storage, wireless communication circuitry, etc.) and software (e.g., an operating system) to support a mobile architecture and portability, a computer, a server (e.g., stand-alone, rack-mounted, blade, etc.), a network appliance (e.g., physical or virtual), a web appliance, a distributed computing system, a processor-based system, a multiprocessor system, a set-top box, and/or any other computing/communication device capable of performing the functions described herein.

The illustrative source computing device 102 includes a processor (i.e., a CPU) 110, an input/output (I/O) subsystem 112, a memory 114, a graphics processing unit (GPU) 116, a data storage device 118, and communication circuitry 120, as well as, in some embodiments, one or more peripheral devices 124. Of course, the source computing device 102 may include other or additional components in other embodiments, such as those commonly found in a computing device. Additionally, in some embodiments, one or more of the illustrative components may be incorporated in, or otherwise form a portion of, another component. For example, in some embodiments, the memory 114, or portions thereof, may be incorporated in the processor 110. Further, in some embodiments, one or more of the illustrative components may be omitted from the source computing device 102.

The processor 110 may be embodied as any type of processor capable of performing the functions described herein. Accordingly, the processor 110 may be embodied as a single or multi-core processor(s), digital signal processor, microcontroller, or other processor or processing/controlling circuit. The memory 114 may be embodied as any type of volatile or non-volatile memory or data storage capable of performing the functions described herein. In operation, the memory 114 may store various data and software used during operation of the source computing device 102, such as operating systems, applications, programs, libraries, and drivers.

The memory 114 is communicatively coupled to the processor 110 via the I/O subsystem 112, which may be embodied as circuitry and/or components to facilitate input/output operations with the processor 110, the memory 114, and the GPU 116, as well as other components of the source computing device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the source computing device 102, on a single integrated circuit chip.

The GPU 116 may be embodied as circuitry and/or components to handle specific types of tasks assigned to the GPU 116, such as image rendering, for example. To do so, the GPU 116 may include an array of processor cores or parallel processors (not shown), each of which can execute a number of parallel and concurrent threads. In some embodiments, the processor cores of the GPU 116 may be configured to individually handle 3D rendering tasks, blitter (e.g., 2D graphics), and/or video encoding/decoding tasks, by providing electronic circuitry that can perform mathematical operations rapidly using extensive parallelism and multiple concurrent threads. It should be appreciated that, in some embodiments, the GPU 116 may have direct access to the memory 114, thereby allowing direct memory access (DMA) functionality in such embodiments.

The data storage device 118 may be embodied as any type of device or devices configured for short-term or long-term storage of data such as, for example, memory devices and circuits, memory cards, hard disk drives, solid-state drives, or other data storage devices. It should be appreciated that the data storage device 118 and/or the memory 114 (e.g., the computer-readable storage media) may store various data as described herein, including operating systems, applications, programs, libraries, drivers, instructions, etc., capable of being executed by a processor (e.g., the processor 110) of the source computing device 102.

The communication circuitry 120 may be embodied as any communication circuit, device, or collection thereof, capable of enabling communications between the source computing device 102 and other computing devices (e.g., the destination computing device 106 and/or other computing devices communicatively coupled to the source computing device 102) over a wired or wireless communication channel (e.g., the communication channel 104). The communication circuitry 120 may be configured to use any one or more wired or wireless communication technologies and associated protocols (e.g., Ethernet, Wi-Fi®, Wi-Fi Direct®, Bluetooth®, Bluetooth® Low Energy (BLE), near-field communication (NFC), Worldwide Interoperability for Microwave Access (WiMAX), etc.) and/or certified technologies (e.g., Digital Living Network Alliance (DLNA), Miracast™, etc.) to affect such communication. The communication circuitry 120 may be additionally configured to use any one or more wireless and/or wired communication technologies and associated protocols to effect communication with other computing devices, such as over a network, for example.

The illustrative communication circuitry 120 includes a network interface controller (NIC) 122. The NIC 122 may be embodied as one or more add-in-boards, daughtercards, network interface cards, controller chips, chipsets, or other devices that may be used by the source computing device 102. In some embodiments, for example, the NIC 122 may be integrated with the processor 110, embodied as an expansion card coupled to the I/O subsystem 112 over an expansion bus (e.g., PCI Express), included as a part of a SoC that includes one or more processors, or included on a multichip package that also contains one or more processors.

The peripheral devices 124 may include any number of I/O devices, interface devices, and/or other peripheral devices. For example, in some embodiments, the peripheral devices 124 may include a display, a touch screen, graphics circuitry, a keyboard, a mouse, a microphone, a speaker, and/or other input/output devices, interface devices, and/or peripheral devices. The particular devices included in the peripheral devices 124 may depend on, for example, the type and/or intended use of the source computing device 102. The peripheral devices 124 may additionally or alternatively include one or more ports, such as a universal serial bus (USB) port, a high-definition multimedia interface (HDMI) port, etc., for connecting external peripheral devices to the source computing device 102.

In the illustrative embodiment, the communication channel 104 is embodied as a direct line of communication (i.e., no wireless access point) between the source computing device 102 and the destination computing device 106. For example, the communication channel 104 may be established over an ad hoc peer-to-peer connection, such as Wi-Fi Direct®, Intel® Wireless Display (WiDi), etc. Alternatively, in some embodiments, the communication channel 104 may be embodied as any type of wired or wireless communication network, including a wireless local area network (WLAN), a wireless personal area network (WPAN), a cellular network (e.g., Global System for Mobile Communications (GSM), Long-Term Evolution (LTE), etc.), a telephony network, a digital subscriber line (DSL) network, a cable network, a local area network (LAN), a wide area network (WAN), a global network (e.g., the Internet), or any combination thereof. It should be appreciated that, in such embodiments, the communication channel 104 may serve as a centralized network and, in some embodiments, may be communicatively coupled to another network (e.g., the Internet). Accordingly, in such embodiments, the communication channel 104 may include a variety of virtual and/or physical network devices (not shown), such as routers, switches, network hubs, servers, storage devices, compute devices, etc., as needed to facilitate the transfer of data between the source computing device 102 and the destination computing device 106.

The destination computing device 106 may be embodied as any type of computation or computing device capable of performing the functions described herein, including, without limitation, a computer, a portable computing device (e.g., smartphone, tablet, laptop, notebook, wearable, etc.), a "smart" television, a cast hub, a cast dongle, a processor-based system, and/or a multiprocessor system. Similar to the illustrative source computing device 102, the destination computing device 106 includes a processor 130, an I/O subsystem 132, a memory 134, a GPU 136, a data storage device 138, communication circuitry 140 that includes a NIC 142, and one or more peripheral devices 144. As such, further descriptions of the like components are not repeated herein with the understanding that the description of the corresponding components provided above in regard to the source computing device 102 applies equally to the corresponding components of the destination computing device 106.

Figure 2:
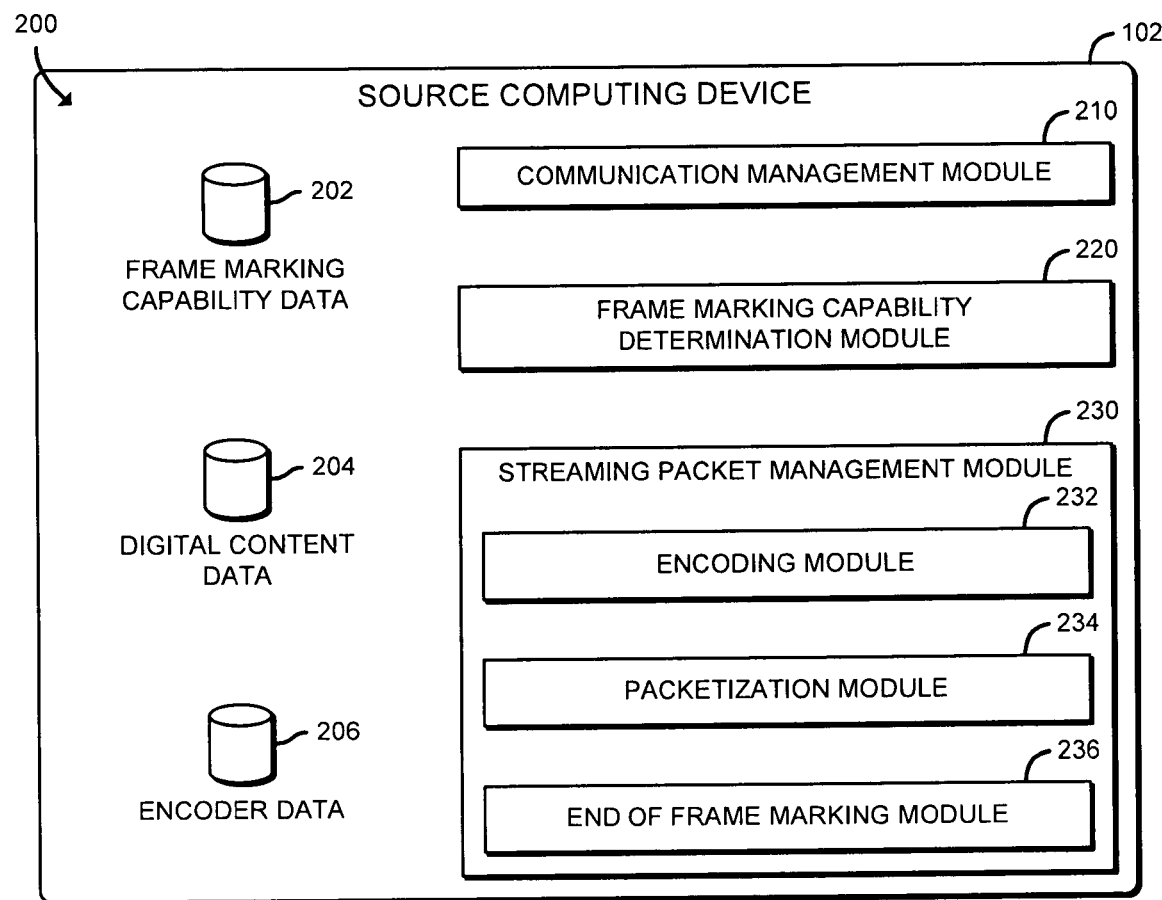
FIG. 2 is a simplified block diagram of at least one embodiment of an environment of the source computing device of the system of FIG. 1.

Referring now to FIG. 2, in an illustrative embodiment, the source computing device 102 establishes an environment 200 during operation. The illustrative environment 200 includes a communication management module 210, a frame marking capability determination module 220, and a streaming packet management module 230. The various modules of the environment 200 may be embodied as hardware, firmware, software, or a combination thereof. As such, in some embodiments, one or more of the modules of the environment 200 may be embodied as circuitry or collection of electrical devices (e.g., a communication management circuit 210, a frame marking capability determination circuit 220, a streaming packet management circuit 230, etc.).

It should be appreciated that, in such embodiments, one or more of the communication management circuit 210, the frame marking capability determination circuit 220, the streaming packet management circuit 230 may form a portion of one or more of the processor 110, the I/O subsystem 112, the GPU 116, the communication circuitry 120, and/or other components of the source computing device 102. Additionally, in some embodiments, one or more of the illustrative modules may form a portion of another module and/or one or more of the illustrative modules may be independent of one another. Further, in some embodiments, one or more of the modules of the environment 200 may be embodied as virtualized hardware components or emulated architecture, which may be established and maintained by the processor 110 or other components of the source computing device 102.

In the illustrative environment 200, the source computing device 102 includes frame marking capability data 202, digital content data 204, and encoder data 206, each of which may be accessed by the various modules and/or sub-modules of the source computing device 102. It should be appreciated that the source computing device 102 may include other components, sub-components, modules, sub-modules, and/or devices commonly found in a computing device, which are not illustrated in FIG. 2 for clarity of the description.

The communication management module 210, which may be embodied as hardware, firmware, software, virtualized hardware, emulated architecture, and/or a combination thereof as discussed above, is configured to facilitate inbound and outbound wired and/or wireless communications (e.g., network traffic, network packets, network flows, etc.) to and from the source computing device 102. To do so, the communication management module 210 is configured to receive and process network packets from other computing devices (e.g., the destination computing device 106 and/or other computing device(s) communicatively coupled to the source computing device 102). Additionally, the communication management module 210 is configured to prepare and transmit network packets to another computing device (e.g., the destination computing device 106 and/or other computing device(s) communicatively coupled to the source computing device 102).

The frame marking capability determination module 220, which may be embodied as hardware, firmware, software, virtualized hardware, emulated architecture, and/or a combination thereof as discussed above, is configured to determine whether the destination computing device 106 supports end of frame detection (see also, e.g., the communication flow 600 of FIG. 6 described below). In other words, the frame marking capability determination module 220 is configured to perform a capability exchange with the destination computing device 106 to determine whether the destination computing device 106 supports the end of frame indication (i.e., can detect and interpret the end of frame indication), such as may be included in a particular header field of the network packets transmitted to the destination computing device 106.

It should be appreciated that the frame marking capability determination module 220 may be configured to perform the capability exchange during setup of the communication channel 104. Accordingly, a frame marker capability indicator may be any type of data that indicates whether the respective computing device is configured to support end of frame marking, such as a Boolean value, for example. In such an embodiment, a not supported value, or value of "0", may be used to indicate that end of frame marking is not supported and a supported value, or value of "1", may be used to indicate that end of frame marking is supported.

For example, in an embodiment using the RTSP protocol to exchange computing device capabilities, the frame marker capability indicator may be associated with an RTSP parameter (e.g., an "eof_mark_support" parameter) to be sent with a request message from the source computing device 102 and received with a response from the destination computing device 106 during initial configuration (i.e., negotiation and exchange of various parameters) of a communication channel (e.g., the communication channel 104 of FIG. 1) between the source computing device 102 and the destination computing device 106. In some embodiments, whether the source computing device 102 supports end of frame marking, which end of frame indication(s) are supported by the source computing device 102, whether the destination computing device 106 supports end of frame marking, and/or which end of frame indication(s) are supported by the destination computing device 106 may be stored in the frame marking capability data 202.

It should also be appreciated that, in some embodiments, one or both of the source computing device 102 and the destination computing device 106 may support more than one end of frame indication marker. In such embodiments, the capability exchange may further include a negotiation between the source computing device 102 and the destination computing device 106 to negotiate which end of frame indication markers are supported and which of the supported end of frame indication markers are to be used during a particular streaming session. Accordingly, in such embodiments, the supported end of frame indication markers (e.g., of the source computing device 102 and/or the destination computing device 106) and/or which of the supported end of fame indication markers are determined to be used during the particular streaming session may be stored in the frame marking capability data 302.

The streaming packet management module 230, which may be embodied as hardware, firmware, software, virtualized hardware, emulated architecture, and/or a combination thereof as discussed above, is configured to manage generation of a network packet that includes a header and a payload. To do so, the illustrative streaming packet management module 230 includes an encoding module 232, a packetization module 234, and an end of frame marking module 236. It should be appreciated that each of the encoding module 232, the packetization module 234, and/or the end of frame marking module 236 of the streaming packet management module 230 may be separately embodied as hardware, firmware, software, virtualized hardware, emulated architecture, and/or a combination thereof. For example, the encoding module 232 may be embodied as a hardware component, while the packetization module 234 and/or the end of frame marking module 236 is embodied as a virtualized hardware component or as some other combination of hardware, firmware, software, virtualized hardware, emulated architecture, and/or a combination thereof.

The encoding module 232 is configured to encode a frame of digital media content (i.e., using an encoder of the source computing device 102) to be streamed (i.e., transmitted for display) to the destination computing device 106. In some embodiments, the digital media content to be streamed may be stored in the digital content data 204. Additionally or alternatively, in some embodiments, information associated with the encoder (e.g., which encoders/decoders are supported by the source computing device 102 and/or the destination computing device 106) may be stored in the encoder data 206.

As described previously, data of a frame may have a size that is too large to attach as a single payload of a network packet based on transmission size restrictions of the source computing device 102 and/or the destination computing device 106. For example, the frame size may be larger than a predetermined maximum transmission unit. Accordingly, the packetization module 234 (e.g., a packetizer of the source computing device 102) is configured to packetize the frame (i.e., the encoded frame) into a plurality of chunks, the total of which may be determined by a function of a total size of the frame and the predetermined maximum transmission unit size.

The packetization module 234 is further configured to attach a header including identifying information to each of the chunks, forming a sequence of network packets for transmission to the destination computing device 106. Such packetization results in a first network packet that includes the first chunk of data, a number of intermediate network packets that include the intermediate chunks of frame data, and a last network packet that includes the last chunk of frame data required to be received by the destination computing device 106 (i.e., the end of the frame) before the destination computing device 106 can decode the frame based on the received chunks of the frame.

Figure 4:
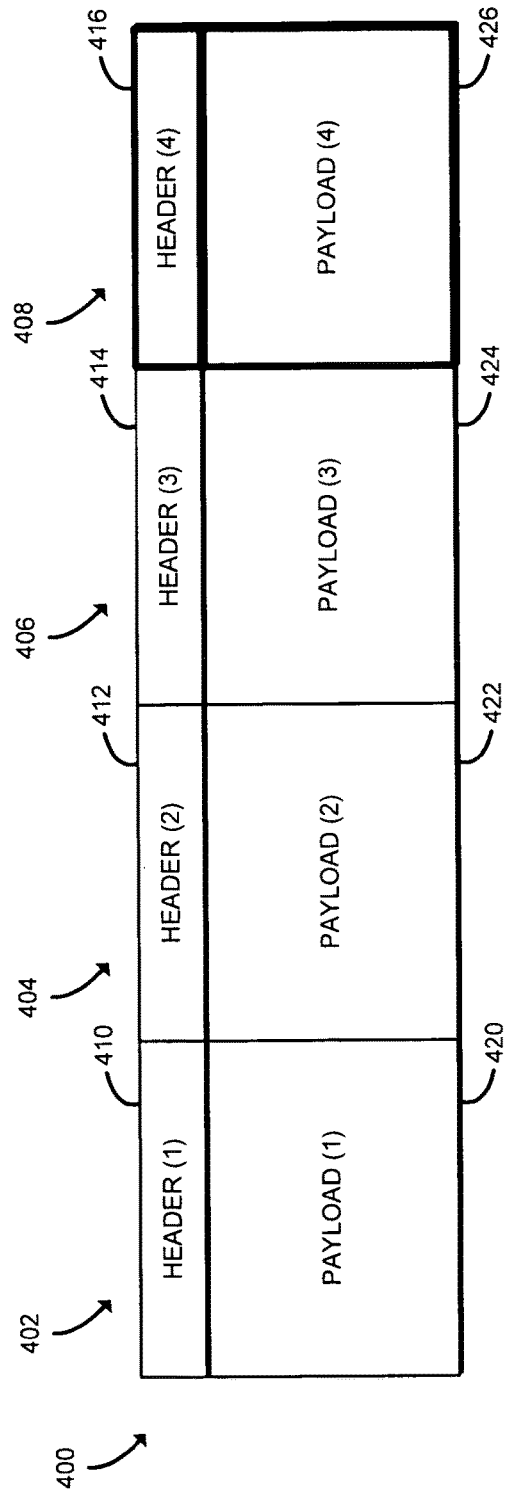
FIG. 4 is a simplified block diagram of at least one embodiment of a queue of packetized network packets of a frame of digital media content.

For example, as shown in FIG. 4, a network packet queue 400 represents a frame to be streamed that is packetized (i.e., chunked) into four separate network packets (i.e., a first network packet 402, a first intermediate network packet 404, a second intermediate network packet 406, and a last network packet 408). In other words, each chunk is packetized as a payload (i.e., a first payload 420, a first intermediate payload 422, a second intermediate payload 424, and a last payload 426) of one of the four network packets with associated headers (i.e., a first header 410, a first intermediate header 412, a second intermediate header 414, and a last header 416) that are affixed to each of the payloads 420, 422, 424, 426, to establish the network packet queue 400.

Referring back to FIG. 2, the end of frame marking module 236 is configured to mark each of the network packets that include a chunk of data corresponding to at least a portion of a frame of digital media content prior to transmission to the destination computing device 106. To do so, the end of frame marking module 236 is configured to mark the last network packet (e.g., the last network packet 408 of FIG. 4), such as by updating a predetermined field of a header of the network packet (e.g., the last header 416 of FIG. 4).

Figure 5:
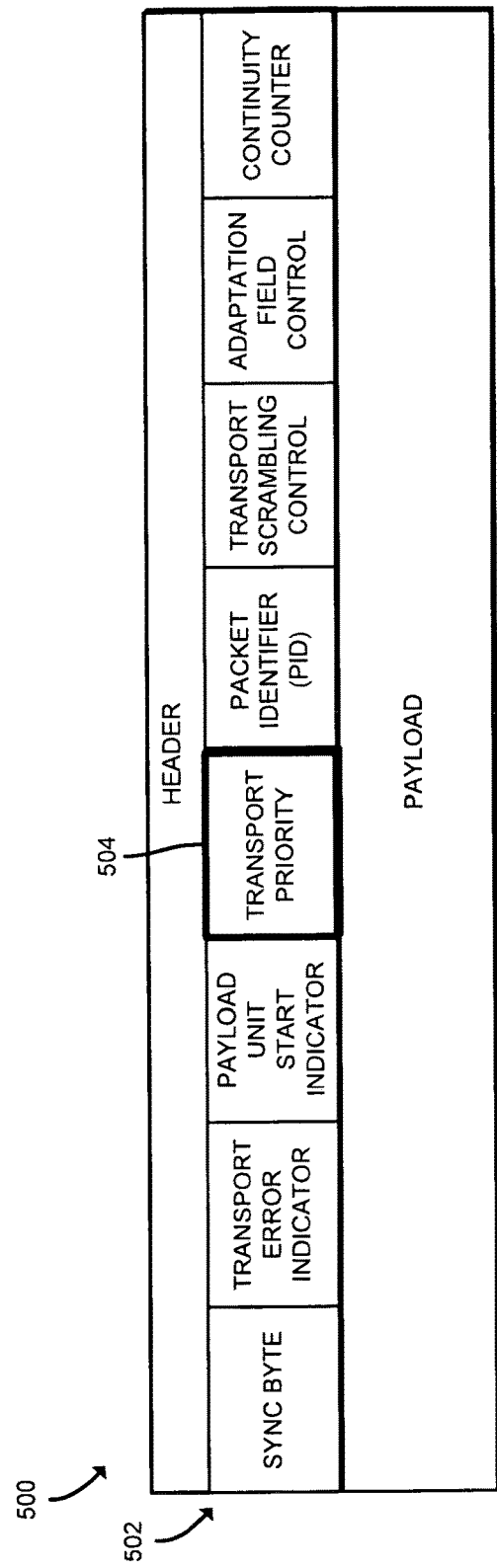
FIG. 5 is a simplified block diagram of at least one embodiment of illustrative fields of a header of one of the packetized network packet of the frame of digital media content of FIG. 4.

For example, FIG. 5 illustrates an embodiment of the container header fields 502 of a network packet 500 using MPEG2-TS as a container for video and audio streams, and H.264 as the video format (i.e., the video format carried inside the MPEG2-TS container). The network packet 500 header fields 502 include various designated fields allocated to certain bits of the header (i.e., the transport stream header) of the network packet as defined by the MPEG2-TS standard container format, as shown in FIG. 5. It should be appreciated that one or more of the network packet header fields may not be used by certain streaming specifications, such as the single bit transport priority field 504 in the Miracast™ specification (version 1.0.0 of the specification for the Wi-Fi Alliance® Wi-Fi CERTIFIED Miracast™ program, a solution for wireless video streaming published in 2012 by the Wi-Fi Alliance®). Accordingly, in such applications, the single bit transport priority field 504 (i.e., as a Boolean value) may be used as an end of frame indicator. For example, if the network packet 500 is the last network packet of the frame (i.e., an end of frame network packet), the single bit transport priority field 504 is set to "1"; otherwise, the single bit transport priority field 504 is set to "0". It should be appreciated that additional and/or alternative bit(s) may be used in other embodiments to indicate whether the network packet corresponds to an end of frame.

Figure 3:
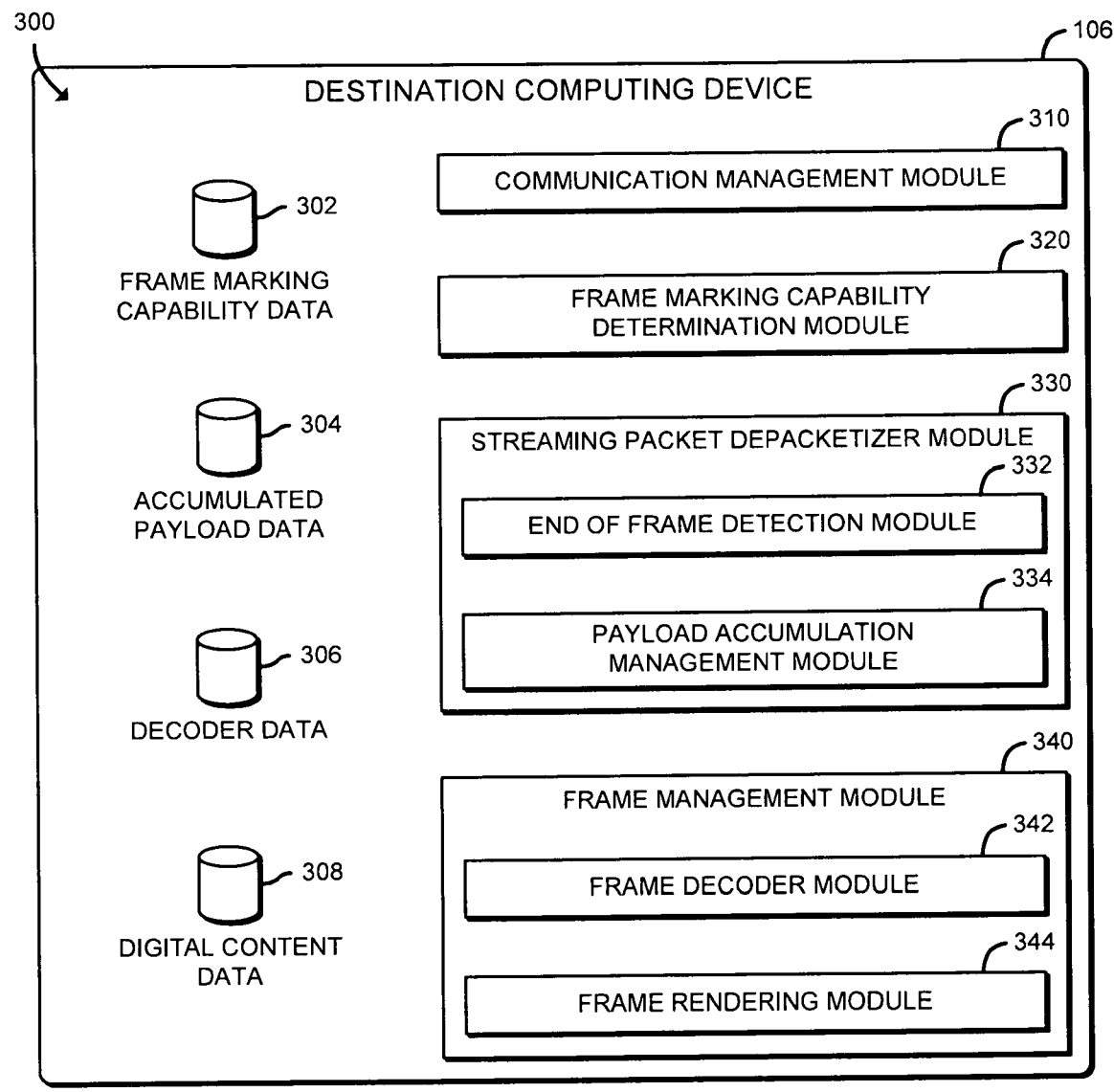
FIG. 3 is a simplified block diagram of at least one embodiment of an environment of the destination computing device of the system of FIG. 1.

Referring now to FIG. 3, in an illustrative embodiment, the destination computing device 106 establishes an environment 300 during operation. The illustrative environment 300 includes a communication management module 310, a capability negotiation module 320, and a digital media content rendering module 330. The various modules of the environment 300 may be embodied as hardware, firmware, software, or a combination thereof. As such, in some embodiments, one or more of the modules of the environment 300 may be embodied as circuitry or collection of electrical devices (e.g., a communication management circuit 310, a frame marking capability determination circuit 320, a streaming packet depacketizer circuit 330, a frame management circuit 340, etc.).

It should be appreciated that, in such embodiments, one or more of the communication management circuit 310, the frame marking capability determination circuit 320, the streaming packet depacketizer circuit 330, and the frame management circuit 340 may form a portion of one or more of the processor 130, the I/O subsystem 132, the GPU 136, the communication circuitry 140, and/or other components of the destination computing device 106. Additionally, in some embodiments, one or more of the illustrative modules may form a portion of another module and/or one or more of the illustrative modules may be independent of one another. Further, in some embodiments, one or more of the modules of the environment 300 may be embodied as virtualized hardware components or emulated architecture, which may be established and maintained by the processor 130 or other components of the destination computing device 106.

In the illustrative environment 300, the destination computing device 106 includes frame marking capability data 302, accumulated payload data 304, decoder data 306, and digital content data 308, each of which may be accessed by the various modules and/or sub-modules of the destination computing device 106. It should be appreciated that the destination computing device 106 may include other components, sub-components, modules, sub-modules, and/or devices commonly found in a computing device, which are not illustrated in FIG. 3 for clarity of the description.

The communication management module 310, which may be embodied as hardware, firmware, software, virtualized hardware, emulated architecture, and/or a combination thereof as discussed above, is configured to facilitate inbound and outbound wired and/or wireless communications (e.g., network traffic, network packets, network flows, etc.) to and from the destination computing device 106, similar to the communication management module 210 of the illustrative source computing device 102 of FIG. 2. To do so, the communication management module 310 is configured to receive and process network packets from other computing devices (e.g., the source computing device 102 and/or other computing device(s) communicatively coupled to the destination computing device 106). Additionally, the communication management module 310 is configured to prepare and transmit network packets to another computing device (e.g., the source computing device 102 and/or other computing device(s) communicatively coupled to the destination computing device 106).

The frame marking capability determination module 320, which may be embodied as hardware, firmware, software, virtualized hardware, emulated architecture, and/or a combination thereof as discussed above, is configured to determine whether the source computing device 102 supports end of frame marking and detection (see also, e.g., the communication flow 600 of FIG. 6 described below), similar to the frame marking capability determination module 220 of the illustrative source computing device 102 of FIG. 2. In other words, the frame marking capability determination module 320 is configured to perform a capability exchange with the source computing device 102 (e.g., via RTSP capability negotiations) to determine whether the source computing device 102 supports the end of frame indication (i.e., can detect and interpret the end of frame indication), such as may be included in a particular header field of the network packets received by the destination computing device 106. In some embodiments, whether the destination computing device 106 supports end of frame marking, which end of frame marking indication(s) are supported by the destination computing device 106, whether the source computing device 102 supports end of frame marking, and which end of frame marking indication(s) are supported by the source computing device 102 may be stored in the frame marking capability data 302.

The streaming packet depacketizer module 330, which may be embodied as hardware, firmware, software, virtualized hardware, emulated architecture, and/or a combination thereof as discussed above, is configured to depacketize received network packets (i.e., one or more network packets including at least a portion of data corresponding to a frame). Accordingly, the streaming packet depacketizer module 330 is configured to strip the headers (i.e., the MPEG2-TS headers) from the received network packets. The streaming packet depacketizer module 330 is further configured to parse a predetermined field (e.g., as predetermined by the frame marking capability determination module 320) of the headers stripped from the received network packets (e.g., the transport priority field 504 of FIG. 5) to determine whether the network packet is an end of frame network packet (i.e., the last network packet that includes data of the frame).

To do so, the streaming packet depacketizer module 330 includes an end of frame detection module 332 that is configured to analyze the predetermined header field to determine whether the associated network packet (i.e., payload of the network packet) corresponds to an end of frame. In other words, the end of frame detection module 332 is configured to parse the header to read a particular field of the header to determine whether the payload of the network packet is the last payload necessary to decode the frame associated with the payload.

Further, the streaming packet depacketizer module 330 includes a payload accumulation management module 334 that is configured to manage the payloads of the received network packets. For example, the payload accumulation management module 334 is configured to accumulate the payloads of frames whose end of frame network packet has yet to be received. Such accumulated payloads may be stored in the accumulated payload data 304, in some embodiments. Further, the payload accumulation management module 334 may be configured to transmit the accumulated payloads to the frame management module 340 upon a determination that the end of frame network packet has been received for that group of accumulated payloads.

It should be appreciated that each of the end of frame detection module 332 and the payload accumulation management module 334 of the streaming packet depacketizer module 330 may be separately embodied as hardware, firmware, software, virtualized hardware, emulated architecture, and/or a combination thereof. For example, the end of frame detection module 332 may be embodied as a hardware component, while the payload accumulation management module 334 is embodied as a virtualized hardware component or as some other combination of hardware, firmware, software, virtualized hardware, emulated architecture, and/or a combination thereof.

The frame management module 340, which may be embodied as hardware, firmware, software, virtualized hardware, emulated architecture, and/or a combination thereof as discussed above, is configured to receive accumulated payloads associated with a frame, decode the accumulated payloads, and render the frame. To do so, the illustrative frame management module 340 includes a frame decoder module 342 to decode the accumulated payloads (i.e., at the GPU 136 of the destination computing device 106 of FIG. 1) and a frame rendering module 344 to render the decoded frame for output at an output device of the destination computing device 106 of FIG. 1. In some embodiments, information associated with the decoder (e.g., which encoders/decoders are supported by the source computing device 102 and/or the destination computing device 106) may be stored in the decoder data 306. Additionally or alternatively, in some embodiments, information corresponding to the decoded frame may be stored in the digital content data 308.

Figure 6:
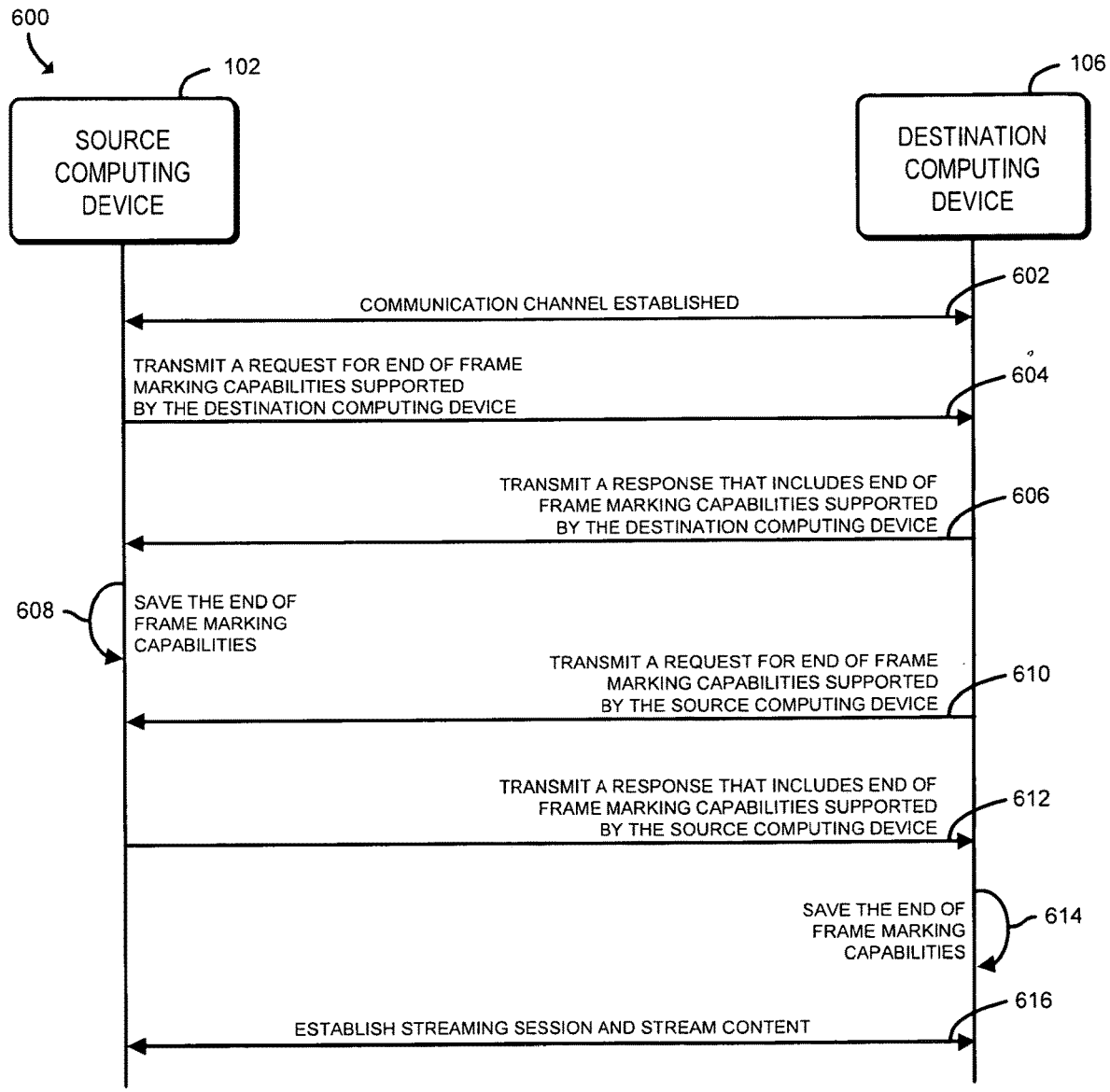
FIG. 6 is a simplified communication flow diagram of at least one embodiment for performing an end of frame marking capability exchange between the source computing device of FIGS. 1 and 2, and the destination computing device of FIGS. 1 and 3 that may be executed by the source computing device.

Referring now to FIG. 6, an embodiment of a communication flow 600 for frame marking capability negotiation includes the source computing device 102 and the destination computing device 106 communicatively coupled over a communication channel (e.g., the communication channel 104 of FIG. 1). The illustrative communication flow 600 includes a number of data flows, some of which may be executed separately or together, depending on the embodiment. In data flow 602, as described previously, the communication channel 104 (e.g., a TCP connection) is established between the source computing device 102 and the destination computing device 106. It should be appreciated that the establishment of the communication channel may be predicated on a distance between the source computing device 102 and the destination computing device 106. It should be further appreciated that the distance may be based on a type and communication range associated with the communication technology employed in establishing the communication channel 104.

In some embodiments, the source computing device 102 and the destination computing device 106 may have been previously connected to each other. In other words, the source computing device 102 and the destination computing device 106 may have previously exchanged pairing data, such as may be exchanged during a Wi-Fi® setup (e.g., manual entry of connection data, Wi-Fi Protected Setup (WPS), etc.) or Bluetooth® pairing (e.g., bonding). To do so, in some embodiments, the source computing device 102 or the destination computing device 106 may have been placed in a discovery mode for establishing the connection. Additionally or alternatively, in some embodiments, the source computing device 102 and the destination computing device 106 may use an out-of-band (OOB) technology (e.g., NFC, USB, etc.) to transfer information by a channel other than the communication channel 104. Accordingly, it should be appreciated that, in such embodiments, the information used to establish the communication channel 104, or the OOB channel, may be stored at the source computing device 102 and/or the destination computing device 106.

In data flow 604, the source computing device 102 transmits a message to the destination computing device 106 (e.g., using RTSP messages) that includes a request for end of frame marking detection capability of the destination computing device 106. In data flow 606, the destination computing device 106 responds to the request message received from the source computing device with a response message that includes the end of frame marking detection capability of the destination computing device 106. In data flow 608, the source computing device 102 saves the end of frame marking detection capability of the destination computing device 106 received in data flow 606.

It should be appreciated that, in some embodiments, more than one end of frame marking capability may be supported by the source computing device 102 and/or the destination computing device 106. Accordingly, as described previously, the end of frame marking detection capability may include an indication as to whether the destination computing device 106 supports end of frame marking, as well as an indication as to how the destination computing device 106 supports end of frame marking (e.g., a particular field of a container header designated as the end of frame marker). In such embodiments, a negotiation flow may be performed between the source computing device 102 and the destination computing device 106 to establish which supported end of frame marking will be used during the streaming session.

In data flow 610, the destination computing device 106 transmits a message to the source computing device 102 that includes a request for end of frame marking detection capability of the source computing device 102. In data flow 612, the source computing device 102 responds to the request message with a response message that includes the end of frame marking detection capability of the source computing device 102. In data flow 614, the destination computing device 106 saves the end of frame marking detection capability of the source computing device 102 received in data flow 612. In data flow 616, the source computing device 102 and the destination computing device 106 establish a streaming session and initiate the streaming of digital media content (see, e.g., the method 700 of FIG. 7 and the method 800 of FIG. 8 described below).

Figure 7:
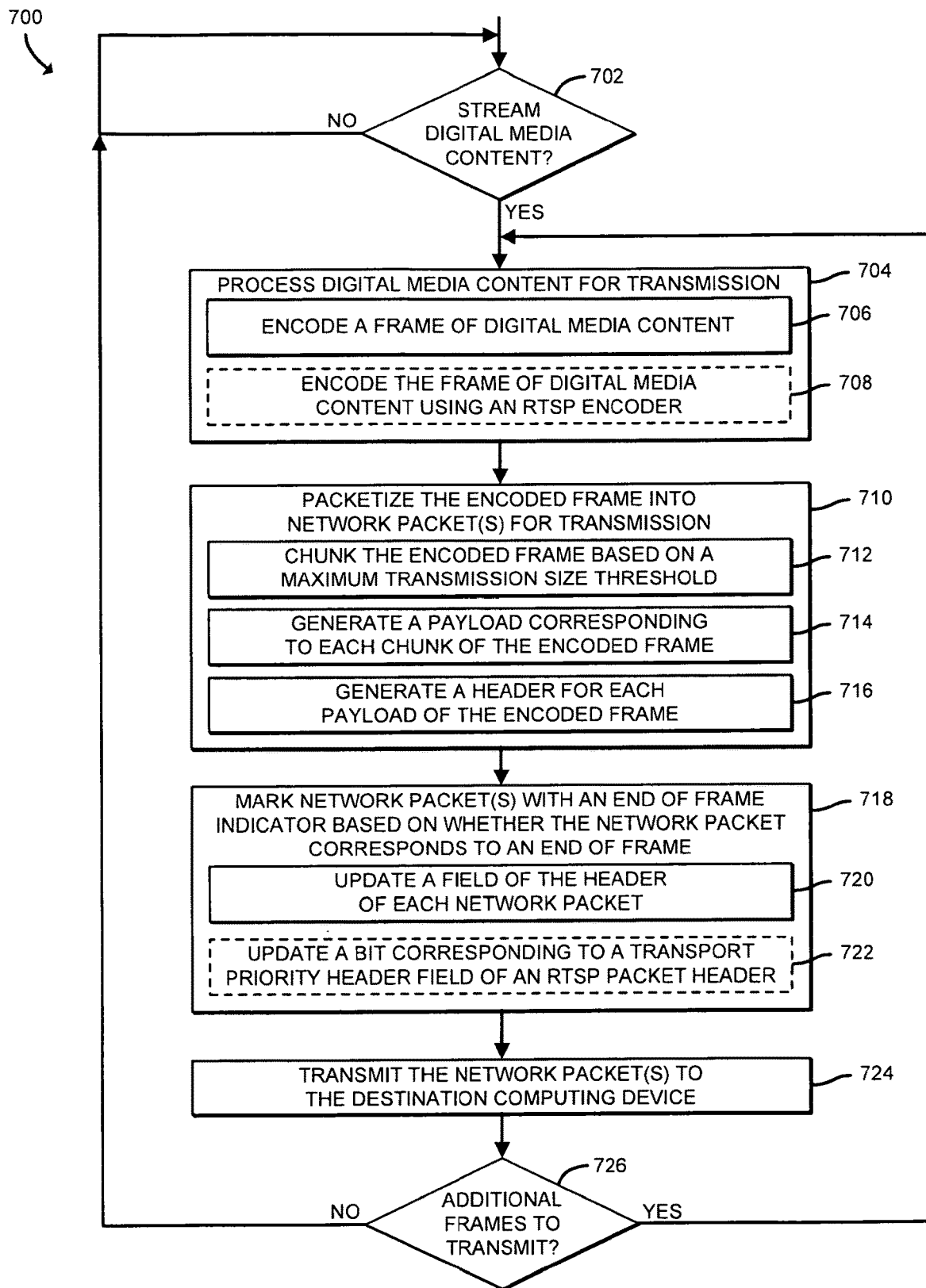
FIG. 7 is a simplified flow diagram of at least one embodiment for end of frame marking of streaming digital media content that may be executed by the source computing device of FIGS. 1 and 2.

Referring now to FIG. 7, in use, the source computing device 102 may execute a method 700 for end of frame marking of digital media content to be streamed to a destination computing device (e.g., the destination computing device 106 of FIG. 1). It should be appreciated that a communication channel (e.g., the communication channel 104 of FIG. 1) has been established and capabilities have been exchanged between the source computing device 102 and the destination computing device 106 (e.g., as described in the illustrative communication flow 600 of FIG. 6).

It should be further appreciated that at least a portion of method 700 may be embodied as various instructions stored on a computer-readable media, which may be executed by the processor 110, the GPU 116, the communication circuitry 120 (e.g., the NIC 122), and/or other components of the source computing device 102 to cause the source computing device 102 to perform the method 700. The computer-readable media may be embodied as any type of media capable of being read by the source computing device 102 including, but not limited to, the memory 114, the data storage device 118, a local memory of the NIC 122 (not shown), other memory or data storage devices of the source computing device 102, portable media readable by a peripheral device of the source computing device 102, and/or other media.

The method 700 begins in block 702, in which the source computing device 102 determines whether to stream digital media content to the destination computing device 106. If the source computing device 102 determines not to stream digital media content to the destination computing device 106 (e.g., digital media content stored on the source computing device 102 has not yet been selected for streaming), the method 700 returns to block 702 to continue to monitor whether to stream the digital media content. Otherwise, the method 700 advances to block 704, wherein the source computing device 102 processes digital media content for transmission to the destination computing device 106. To do so, in block 706, the source computing device 102 encodes a frame of digital media content. For example, in block 708, the source computing device 102 may encode the frame using an RTSP encoder, as described previously.

In block 710, the source computing device 102 packetizes the encoded frame into a streaming packet. To do so, in block 712, the source computing device 102 chunks the encoded frame (see, e.g., the network packet queue 400 FIG. 4) based on a maximum transmission unit size supported by the destination computing device 106, as may be determined during the process of establishing the communication channel 104. Further, in block 714, the source computing device 102 generates a payload for each chunk of the encoded frame chunked in block 712. Additionally, in block 716, the source computing device 102 generates a header to be affixed to each payload of the encoded frame. It should be appreciated that the payload additionally includes a header, the field of which are based on the encoding technology used to encode the frame, which is distinct from the header (i.e., the container header) affixed to each payload as referenced above.

In block 718, the source computing device 102 marks each network packet with an end of frame indicator based on whether the network packet corresponds to an end of frame. To do so, in block 720, the source computing device 102 updates a field of the header (i.e., the container header) of each network packet generated in block 710. For example, in block 722, the source computing device 102 may update one or more bits of the header field (see, e.g., the transport priority field 504 of the header fields 502 of the network packet 500 of FIG. 5) as predetermined during a capability exchange between the source computing device 102 and the destination computing device 106.

In block 724, the source computing device 102 transmits each of the network packets to the destination computing device 106 (e.g., via a queue of network packets). In block 726, the source computing device 102 determines whether additional frames are available to transmit. If not, the method 700 returns to block 702, in which the source computing device 102 monitors whether to again stream digital media content. Otherwise, the method 700 loops back to block 704 to further process digital media content for transmission to the destination computing device 106.

Figure 8:
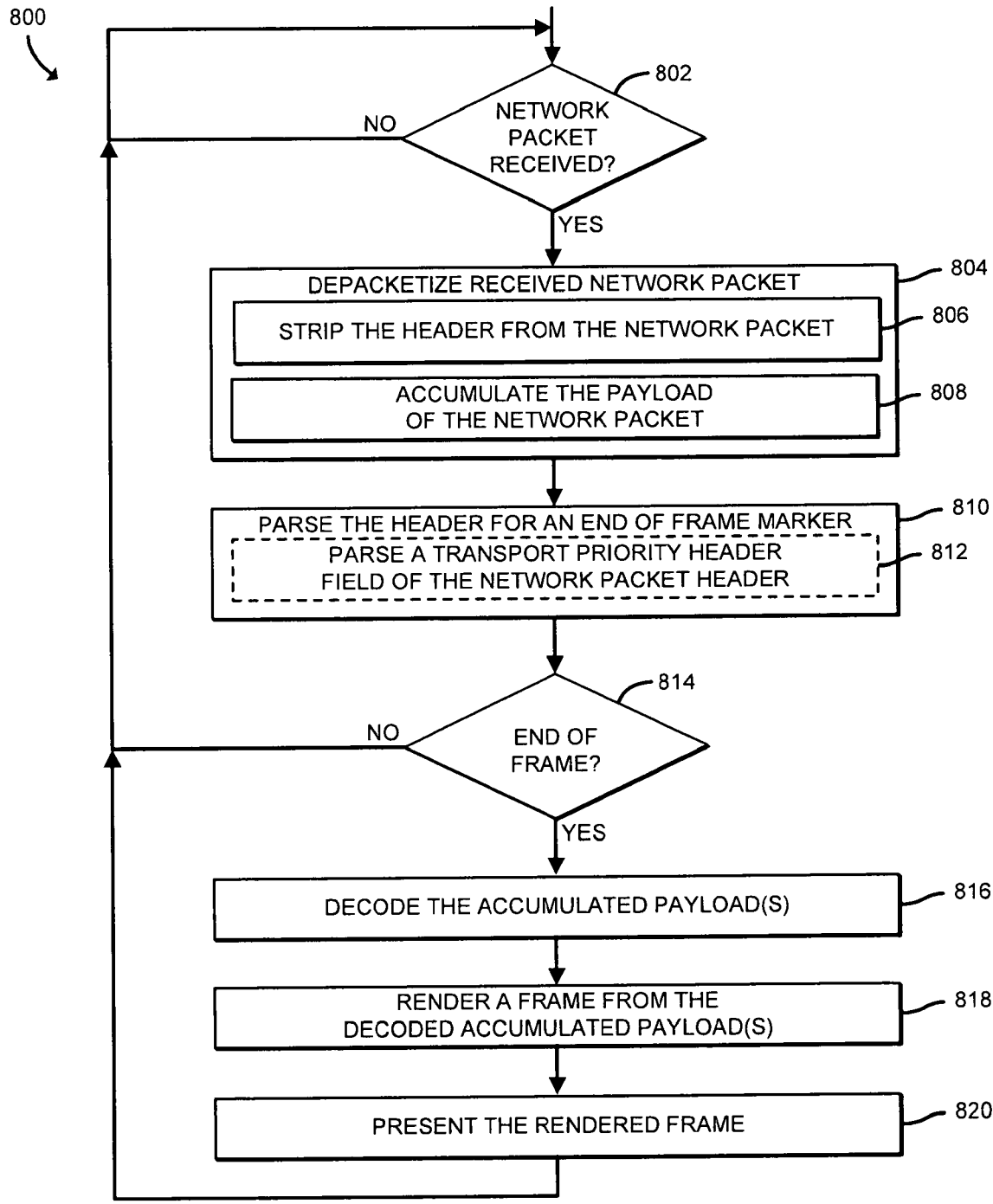
FIG. 8 is a simplified flow diagram of at least one embodiment for end of frame detection of streaming digital media content that may be executed by the destination computing device of FIGS. 1 and 3.

Referring now to FIG. 8, in use, the destination computing device 106 may execute a method 800 for end of frame detection of digital media content streamed from a source computing device (e.g., the source computing device 102 of FIG. 1). It should be appreciated that a communication channel (e.g., the communication channel 104 of FIG. 1) has been established between the destination computing device 106 and the source computing device 102. It should be further appreciated that at least a portion of the method 800 may be embodied as various instructions stored on a computer-readable media, which may be executed by the processor 130, the GPU 136, the communication circuitry 140 (e.g., the NIC 142), and/or other components of the destination computing device 106 to cause the destination computing device 106 to perform the method 800. The computer-readable media may be embodied as any type of media capable of being read by the destination computing device 106 including, but not limited to, the memory 134, the data storage device 138, a local memory of the NIC 142 (not shown), other memory or data storage devices of the destination computing device 106, portable media readable by a peripheral device of the destination computing device 106, and/or other media.

The method 800 begins in block 802, in which the destination computing device 106 determines whether a network packet that includes frame data of digital media content to be rendered by the destination computing device 106 was received from the source computing device 102. If not, the method 800 loops back to block 802 to monitor whether a network packet was received. Otherwise, the method 800 advances to block 804, wherein the destination computing device 106 depacketizes the received network packet. To do so, in block 806, the destination computing device 106 strips the transport stream header from the network packet received in block 802. Additionally, in block 808, the destination computing device 106 accumulates the payload of the received network packet with previous encoded payloads corresponding to the frame. In other words, the destination computing device 106 stores the payload of the received network packet with other payloads of previously received network packets that have not yet been sent to a decoder of the destination computing device 106.

In block 810, the destination computing device 106 parses the transport stream header of the received network packet to locate an end of frame marker (i.e., as described previously, an indicator as to whether the network packet corresponds to an end of the frame, or the last network packet of the frame). For example, in block 812, in an embodiment using an MPEG2-TS container format and an H.264 video encoding format as described above, the destination computing device 106 may parse the transport priority field 504 of the network packet 500 of FIG. 5 to retrieve the end of frame marker. In block 814, the destination computing device 106 determines whether the end of frame marker parsed in block 810 corresponds to an end of frame (e.g., the end of frame marker is indicated by a "1"). If not (e.g., the end of frame marker is indicated by a "0"), the method 800 loops back to block 802; otherwise, the method 800 advances to block 816, wherein the destination computing device 106 decodes the accumulated payloads of the frame corresponding to the end of frame network packet. It should be appreciated that the decoder used by the destination computing device 106 to decode the accumulated payloads is based on the encoder used to encode the frame at the source computing device 102.

In block 818, the destination computing device 106 renders the frame from the decoded payloads accumulated in block 808. To do so, in some embodiments, the GPU 136 of the destination computing device 106 may receive the decoded frame and render the received decoded frame. In block 820, the destination computing device 106 presents the rendered frame via an output device (e.g., one of the peripheral devices 144) of the destination computing device 106. To do so, in some embodiments, the GPU 136 may provide the rendered frame to the output device of the destination computing device 106 for display of video content on a display of the destination computing device 106 or producing audible sound of audio content from a speaker of the destination computing device 106, for example.

EXAMPLES

Illustrative examples of the technologies disclosed herein are provided below. An embodiment of the technologies may include any one or more, and any combination of, the examples described below.

Example 1 includes a source computing device for end of frame marking of streaming digital media content, the source computing device comprising a streaming packet management module to (i) encode a frame of digital media content using an encoder, (ii) packetize the encoded frame of digital media content into a queue of one or more network packets using a transport stream container, wherein each of the network packets includes a transport stream header and an encoded payload, wherein each of the encoded payloads includes an encoded portion of the frame of digital media content, and (iii) mark the transport stream header of each of the network packets with an end of frame indication to indicate whether the network packet corresponds to an end of frame network packet, wherein the end of frame network packet is the last packetized network packet of the encoded frame of digital media content; and a communication management module to transmit, as a function of the order of the network packets in the queue of network packets, each of the network packets to a destination computing device, wherein the network packets are usable by the destination computing device to render the frame of digital media content as a function of the end of frame indication.

Example 2 includes the subject matter of Example 1, and further including a frame marking capability determination module to perform, prior to having encoded the frame of digital media content, an end of frame marking capability negotiation.

Example 3 includes the subject matter of any of Examples 1 and 2, and wherein to perform the end of frame marking capability negotiation comprises to (i) transmit a first request message for end of frame marking capabilities to the destination computing device, (ii) receive, subsequent to the transmission of the first request message, a first response message from the destination computing device that includes end of frame marking capabilities supported by the destination computing device, and (iii) save the end of frame marking capabilities of the destination computing device.

Example 4 includes the subject matter of any of Examples 1-3, and wherein to perform the end of frame marking capability negotiation further comprises to (i) receive a second request message for end of frame marking capabilities from the destination computing device and (ii) transmit, subsequent having received the second request message, a second response message to the destination computing device that includes end of frame marking capabilities supported by the source computing device.

Example 5 includes the subject matter of any of Examples 1-4, and wherein to encode the frame of digital media content comprises to encode the frame of digital media content using a video encoder.

Example 6 includes the subject matter of any of Examples 1-5, and wherein to packetize the frame of digital media content comprises to chunk the frame of digital media content into portions of the frame of digital media content smaller than a total size of the frame of digital media content as a function of a maximum transmission unit size.

Example 7 includes the subject matter of any of Examples 1-6, and wherein to mark the transport stream header to indicate whether the network packet corresponds to the end of frame network packet comprises to mark a bit of the transport stream header corresponding to a transport priority field of an MPEG2-TS network packet header.

Example 8 includes a method for end of frame marking of streaming digital media content, the method comprising encoding, by a source computing device, a frame of digital media content using an encoder; packetizing, by the source computing device, the encoded frame of digital media content into a queue of one or more network packets using a transport stream container, wherein each of the network packets includes a transport stream header of the transport stream container and an encoded payload, wherein each of the encoded payloads includes an encoded portion of the frame of digital media content; marking, by the source computing device, the transport stream header of each of the network packets with an end of frame indication to indicate whether the network packet corresponds to an end of frame network packet, wherein the end of frame network packet is the last packetized network packet of the encoded frame of digital media content; and transmitting, by the source computing device and as a function of the order of the network packets in the queue of network packets, each of the network packets to a destination computing device, wherein the network packets are usable by the destination computing device to render the frame of digital media content as a function of the end of frame indication.

Example 9 includes the subject matter of Example 8, and further including performing, by the source computing device and prior to encoding the frame of digital media content, an end of frame marking capability negotiation.

Example 10 includes the subject matter of any of Examples 8 and 9, and wherein performing the end of frame marking capability negotiation comprises (i) transmitting a first request message for end of frame marking capabilities to the destination computing device, (ii) receiving, subsequent to transmitting the first request message, a first response message from the destination computing device that includes end of frame marking capabilities supported by the destination computing device, and (iii) saving the end of frame marking capabilities of the destination computing device.

Example 11 includes the subject matter of any of Examples 8-10, and wherein performing the end of frame marking capability negotiation further comprises (i) receiving a second request message for end of frame marking capabilities from the destination computing device and (ii) transmitting, subsequent to receiving the second request message, a second response message to the destination computing device that includes end of frame marking capabilities supported by the source computing device.

Example 12 includes the subject matter of any of Examples 8-11, and wherein encoding the frame of digital media content comprises encoding the frame of digital media content using a video encoder.

Example 13 includes the subject matter of any of Examples 8-12, and wherein packetizing the frame of digital media content comprises chunking the frame of digital media content into portions of the frame of digital media content smaller than a total size of the frame of digital media content as a function of a maximum transmission unit size.

Example 14 includes the subject matter of any of Examples 8-13, and wherein marking the transport stream header to indicate whether the network packet corresponds to the end of frame network packet comprises marking a bit of the transport stream header corresponding to a transport priority field of an MPEG2-TS network packet header.

Example 15 includes a source computing device comprising a processor; and a memory having stored therein a plurality of instructions that when executed by the processor cause the source computing device to perform the method of any of Examples 8-14.

Example 16 includes one or more machine readable storage media comprising a plurality of instructions stored thereon that in response to being executed result in a source computing device performing the method of any of Examples 8-14.

Example 17 includes a source computing device for end of frame marking of streaming digital media content, the source computing device comprising means for encoding a frame of digital media content using an encoder; means for packetizing the encoded frame of digital media content into a queue of one or more network packets using a transport stream container, wherein each of the network packets includes a transport stream header of the transport stream container and an encoded payload, wherein each of the encoded payloads includes an encoded portion of the frame of digital media content; means for marking the transport stream header of each of the network packets with an end of frame indication to indicate whether the network packet corresponds to an end of frame network packet, wherein the end of frame network packet is the last packetized network packet of the encoded frame of digital media content; and means for transmitting, as a function of the order of the network packets in the queue of network packets, each of the network packets to a destination computing device, wherein the network packets are usable by the destination computing device to render the frame of digital media content as a function of the end of frame indication.

Example 18 includes the subject matter of Example 17, and further including means for performing, prior to encoding the frame of digital media content, an end of frame marking capability negotiation.

Example 19 includes the subject matter of any of Examples 17 and 18, and wherein the means for performing the end of frame marking capability negotiation comprises means for (i) transmitting a first request message for end of frame marking capabilities to the destination computing device, (ii) receiving, subsequent to transmitting the first request message, a first response message from the destination computing device that includes end of frame marking capabilities supported by the destination computing device, and (iii) saving the end of frame marking capabilities of the destination computing device.

Example 20 includes the subject matter of any of Examples 17-19, and wherein the means for performing the end of frame marking capability negotiation further comprises means for (i) receiving a second request message for end of frame marking capabilities from the destination computing device and (ii) transmitting, subsequent to receiving the second request message, a second response message to the destination computing device that includes end of frame marking capabilities supported by the source computing device.

Example 21 includes the subject matter of any of Examples 17-20, and wherein the means for encoding the frame of digital media content comprises means for encoding the frame of digital media content using a video encoder.

Example 22 includes the subject matter of any of Examples 17-21, and wherein the means for packetizing the frame of digital media content comprises means for chunking the frame of digital media content into portions of the frame of digital media content smaller than a total size of the frame of digital media content as a function of a maximum transmission unit size.

Example 23 includes the subject matter of any of Examples 17-22, and wherein the means for marking the transport stream header to indicate whether the network packet corresponds to the end of frame network packet comprises means for marking a bit of the transport stream header corresponding to a transport priority field of an MPEG2-TS network packet header.

Example 24 includes a destination computing device for end of frame detection of streaming digital media content, the destination computing device comprising a communication management module to receive a network packet from a source computing device, wherein the network packet includes a transport stream header and an encoded payload, wherein the encoded payload includes at least a portion of an encoded frame of digital media content; a streaming packet depacketizer module to (i) de-packetize the network packet, (ii) accumulate the encoded payload of the de-packetized network packet with one or more previously received encoded payloads of other de-packetized network packets corresponding to the same encoded frame of digital media content, (iii) parse the transport stream header of the network packet for an end of frame marker, and (iv) determine whether the end of frame marker corresponds to an end of frame network packet; a frame management module to decode, in response to a determination that the end of frame marker corresponds to an end of frame network packet, the accumulated encoded payloads corresponding to the same encoded frame of digital media content.

Example 25 includes the subject matter of Example 24, and further including a frame marking capability determination module to perform, prior to having received the network packet from the source computing device, an end of frame marking capability negotiation.

Example 26 includes the subject matter of any of Examples 24 and 25, and wherein to perform the end of frame marking capability negotiation comprises to (i) receive a first request message for end of frame marking capabilities from the source computing device and (ii) transmit, subsequent having received the first request message, a first response message to the source computing device that includes end of frame marking capabilities supported by the destination computing device.

Example 27 includes the subject matter of any of Examples 24-26, and wherein to perform the end of frame marking capability negotiation further comprises to (i) transmit a second request message for end of frame marking capabilities to the source computing device, (ii) receive, subsequent to the transmission of the second request message, a second response message from the source computing device that includes end of frame marking capabilities supported by the source computing device, and (iii) save the end of frame marking capabilities of the source computing device.

Example 28 includes the subject matter of any of Examples 24-27, and wherein to parse the transport stream header of the network packet for the end of frame marker comprises to parse a bit of the transport stream header corresponding to a transport priority field of an MPEG2-TS network packet header.

Example 29 includes the subject matter of any of Examples 24-28, and wherein the plurality of instructions further cause the destination computing device to render, subsequent to having decoded the accumulated payloads, a frame of digital media content as a function of the decoded accumulated payloads.

Example 30 includes the subject matter of any of Examples 24-29, and wherein the frame management module is further to transmit, subsequent to having rendered the frame of digital media content, the frame of digital media content for display to an output device of the destination computing device.

Example 31 includes a method for end of frame detection of streaming digital media content, the method comprising receiving, by the destination computing device, a network packet from a source computing device, wherein the network packet includes a transport stream header and an encoded payload, wherein the encoded payload includes at least a portion of an encoded frame of digital media content; de-packetizing, by the destination computing device, the network packet; accumulating, by the destination computing device, the encoded payload of the de-packetized network packet with one or more previously received encoded payloads of other de-packetized network packets corresponding to the same encoded frame of digital media content; parsing, by the destination computing device, the transport stream header of the network packet for an end of frame marker; determining, by the destination computing device, whether the end of frame marker corresponds to an end of frame network packet; decoding, by the destination computing device and in response to a determination that the end of frame marker corresponds to an end of frame network packet, the accumulated encoded payloads corresponding to the same encoded frame of digital media content.

Example 32 includes the subject matter of Example 31, and further including performing, by the destination computing device and prior to having received the network packet from the source computing device, an end of frame marking capability negotiation.

Example 33 includes the subject matter of any of Examples 31 and 32, and wherein performing the end of frame marking capability negotiation comprises (i) receiving a first request message for end of frame marking capabilities from the source computing device and (ii) transmitting, subsequent having received the first request message, a first response message to the source computing device that includes end of frame marking capabilities supported by the destination computing device.

Example 34 includes the subject matter of any of Examples 31-33, and wherein performing the end of frame marking capability negotiation further comprises (i) transmitting a second request message for end of frame marking capabilities to the source computing device, (ii) receiving, subsequent to the transmission of the second request message, a second response message from the source computing device that includes end of frame marking capabilities supported by the source computing device, and (iii) saving the end of frame marking capabilities of the source computing device.

Example 35 includes the subject matter of any of Examples 31-34, and wherein parsing the transport stream header of the network packet for the end of frame marker comprises parsing a bit of the transport stream header corresponding to a transport priority field of an MPEG2-TS network packet header.

Example 36 includes the subject matter of any of Examples 31-35, and further including rendering, by the destination computing device and subsequent to decoding the accumulated payloads, a frame of digital media content as a function of the decoded accumulated payloads.

Example 37 includes the subject matter of any of Examples 31-36, and further including displaying, by the destination computing device and subsequent to rendering the frame of digital media content, the frame of digital media content via an output device of the destination computing device.

Example 38 includes a destination computing device comprising a processor; and a memory having stored therein a plurality of instructions that when executed by the processor cause the destination computing device to perform the method of any of Examples 31-37.

Example 39 includes one or more machine readable storage media comprising a plurality of instructions stored thereon that in response to being executed result in a destination computing device performing the method of any of Examples 31-37.

Example 40 includes a destination computing device for end of frame detection of streaming digital media content, the destination computing device comprising means for receiving a network packet from a source computing device, wherein the network packet includes a transport stream header and an encoded payload, wherein the encoded payload includes at least a portion of an encoded frame of digital media content; means for de-packetizing the network packet; means for accumulate the encoded payload of the de-packetized network packet with one or more previously received encoded payloads of other de-packetized network packets corresponding to the same encoded frame of digital media content; means for parsing the transport stream header of the network packet for an end of frame marker; means for determining whether the end of frame marker corresponds to an end of frame network packet; means for decoding, in response to a determination that the end of frame marker corresponds to an end of frame network packet, the accumulated encoded payloads corresponding to the same encoded frame of digital media content.

Example 41 includes the subject matter of Example 40, and further including means for performing, prior to having received the network packet from the source computing device, an end of frame marking capability negotiation.

Example 42 includes the subject matter of any of Examples 40 and 41, and wherein the means for performing the end of frame marking capability negotiation comprises means for (i) receiving a first request message for end of frame marking capabilities from the source computing device and (ii) transmitting, subsequent having received the first request message, a first response message to the source computing device that includes end of frame marking capabilities supported by the destination computing device.

Example 43 includes the subject matter of any of Examples 40-42, and wherein the means for performing the end of frame marking capability negotiation further comprises means for (i) transmitting a second request message for end of frame marking capabilities to the source computing device, (ii) receiving, subsequent to the transmission of the second request message, a second response message from the source computing device that includes end of frame marking capabilities supported by the source computing device, and (iii) saving the end of frame marking capabilities of the source computing device.

Example 44 includes the subject matter of any of Examples 40-43, and wherein the means for parsing the transport stream header of the network packet for the end of frame marker comprises parsing a bit of the transport stream header corresponding to a transport priority field of an MPEG2-TS network packet header.

Example 45 includes the subject matter of any of Examples 40-44, and further including means for rendering, subsequent to decoding the accumulated payloads, a frame of digital media content as a function of the decoded accumulated payloads.

Example 46 includes the subject matter of any of Examples 40-45, and further including means for displaying, subsequent to rendering the frame of digital media content, the frame of digital media content via an output device of the destination computing device.

The invention claimed is:

1. A destination computing device for end of frame detection of streaming digital media content, the destination computing device comprising:
   a communication management module to receive a network packet from a source computing device, wherein the network packet includes a transport stream header and an encoded payload, wherein the encoded payload includes at least a portion of an encoded frame of digital media content;
   a streaming packet depacketizer module to (i) de-packetize the network packet, (ii) accumulate the encoded payload of the de-packetized network packet with one or more previously received encoded payloads of other de-packetized network packets corresponding to the same encoded frame of digital media content, (iii) parse the transport stream header of the network packet for an end of frame marker, and (iv) determine whether the end of frame marker corresponds to an end of frame network packet;
   a frame management module to decode, in response to a determination that the end of frame marker corresponds to an end of frame network packet, the accumulated encoded payloads corresponding to the same encoded frame of digital media content.

2. The destination computing device of claim 1, further comprising a frame marking capability determination module to perform, prior to having received the network packet from the source computing device, an end of frame marking capability negotiation.

3. The destination computing device of claim 2, wherein to perform the end of frame marking capability negotiation comprises to (i) receive a first request message for end of frame marking capabilities from the source computing device and (ii) transmit, subsequent having received the first request message, a first response message to the source computing device that includes end of frame marking capabilities supported by the destination computing device.

4. The destination computing device of claim 3, wherein to perform the end of frame marking capability negotiation further comprises to (i) transmit a second request message for end of frame marking capabilities to the source computing device, (ii) receive, subsequent to the transmission of the second request message, a second response message from the source computing device that includes end of frame marking capabilities supported by the source computing device, and (iii) save the end of frame marking capabilities of the source computing device.

5. The destination computing device of claim 1, wherein to parse the transport stream header of the network packet for the end of frame marker comprises to parse a bit of the transport stream header corresponding to a transport priority field of an MPEG2-TS network packet header.

6. The destination computing device of claim 1, wherein the plurality of instructions further cause the destination computing device to render, subsequent to having decoded the accumulated payloads, a frame of digital media content as a function of the decoded accumulated payloads.

7. The destination computing device of claim 1, wherein the frame management module is further to transmit, subsequent to having rendered the frame of digital media content, the frame of digital media content for display to an output device of the destination computing device.

8. One or more machine-readable storage media comprising a plurality of instructions stored thereon that, in response to execution by a destination computing device, cause the destination computing device to:
  receive a network packet from a source computing device, wherein the network packet includes a transport stream header and an encoded payload, wherein the encoded payload includes at least a portion of an encoded frame of digital media content;
  de-packetize the network packet;
  accumulate the encoded payload of the de-packetized network packet with one or more previously received encoded payloads of other de-packetized network packets corresponding to the same encoded frame of digital media content;
  parse the transport stream header of the network packet for an end of frame marker; and
  determine whether the end of frame marker corresponds to an end of frame network packet;
  decode, in response to a determination that the end of frame marker corresponds to an end of frame network packet, the accumulated encoded payloads corresponding to the same encoded frame of digital media content.

9. The one or more machine-readable storage media of claim 8, wherein the plurality of instructions further cause the destination computing device to perform, prior to having received the network packet from the source computing device, an end of frame marking capability negotiation, wherein to perform the end of frame marking capability negotiation comprises to (i) receive a first request message for end of frame marking capabilities from the source computing device and (ii) transmit, subsequent having received the first request message, a first response message to the source computing device that includes end of frame marking capabilities supported by the destination computing device.

10. The one or more machine-readable storage media of claim 9, wherein to perform the end of frame marking capability negotiation further comprises to (i) transmit a second request message for end of frame marking capabilities to the source computing device, (ii) receive, subsequent to the transmission of the second request message, a second response message from the source computing device that includes end of frame marking capabilities supported by the source computing device, and (iii) save the end of frame marking capabilities of the source computing device.

11. The one or more machine-readable storage media of claim 9, wherein to parse the transport stream header of the network packet for the end of frame marker comprises to parse a bit of the transport stream header corresponding to a transport priority field of an MPEG2-TS network packet header.

12. The one or more machine-readable storage media of claim 9, wherein the plurality of instructions further cause the destination computing device to render, subsequent to having decoded the accumulated payloads, a frame of digital media content as a function of the decoded accumulated payloads.

13. The one or more machine-readable storage media of claim 9, wherein the plurality of instructions further cause the destination computing device to transmit, subsequent to having rendered the frame of digital media content, the frame of digital media content for display to an output device of the destination computing device.

14. A method for end of frame detection of streaming digital media content, the method comprising:
  receiving, by the destination computing device, a network packet from a source computing device, wherein the network packet includes a transport stream header and an encoded payload, wherein the encoded payload includes at least a portion of an encoded frame of digital media content;
  de-packetizing, by the destination computing device, the network packet;
  accumulating, by the destination computing device, the encoded payload of the de-packetized network packet with one or more previously received encoded payloads of other de-packetized network packets corresponding to the same encoded frame of digital media content;
  parsing, by the destination computing device, the transport stream header of the network packet for an end of frame marker;
  determining, by the destination computing device, whether the end of frame marker corresponds to an end of frame network packet;
  decoding, by the destination computing device and in response to a determination that the end of frame marker corresponds to an end of frame network packet, the accumulated encoded payloads corresponding to the same encoded frame of digital media content.

15. The method of claim 14, further comprising performing, by the destination computing device and prior to having received the network packet from the source computing device, an end of frame marking capability negotiation.

16. The method of claim 15, wherein performing the end of frame marking capability negotiation comprises (i) receiving a first request message for end of frame marking capabilities from the source computing device and (ii) transmitting, subsequent having received the first request message, a first response message to the source computing device that includes end of frame marking capabilities supported by the destination computing device.

17. The method of claim 16, wherein performing the end of frame marking capability negotiation further comprises (i) transmitting a second request message for end of frame marking capabilities to the source computing device, (ii) receiving, subsequent to the transmission of the second request message, a second response message from the source computing device that includes end of frame marking capabilities supported by the source computing device, and (iii) saving the end of frame marking capabilities of the source computing device.

18. The method of claim 14, wherein parsing the transport stream header of the network packet for the end of frame marker comprises parsing a bit of the transport stream header corresponding to a transport priority field of an MPEG2-TS network packet header.

19. The method of claim 14, further comprising rendering, by the destination computing device and subsequent to decoding the accumulated payloads, a frame of digital media content as a function of the decoded accumulated payloads.

20. The method of claim 14, further comprising displaying, by the destination computing device and subsequent to rendering the frame of digital media content, the frame of digital media content via an output device of the destination computing device.

\* \* \* \* \*